Nov. 29, 1960
A. H. SOOTER
2,961,981
PLANTER
Filed Oct. 8, 1957
2 Sheets-Sheet 1
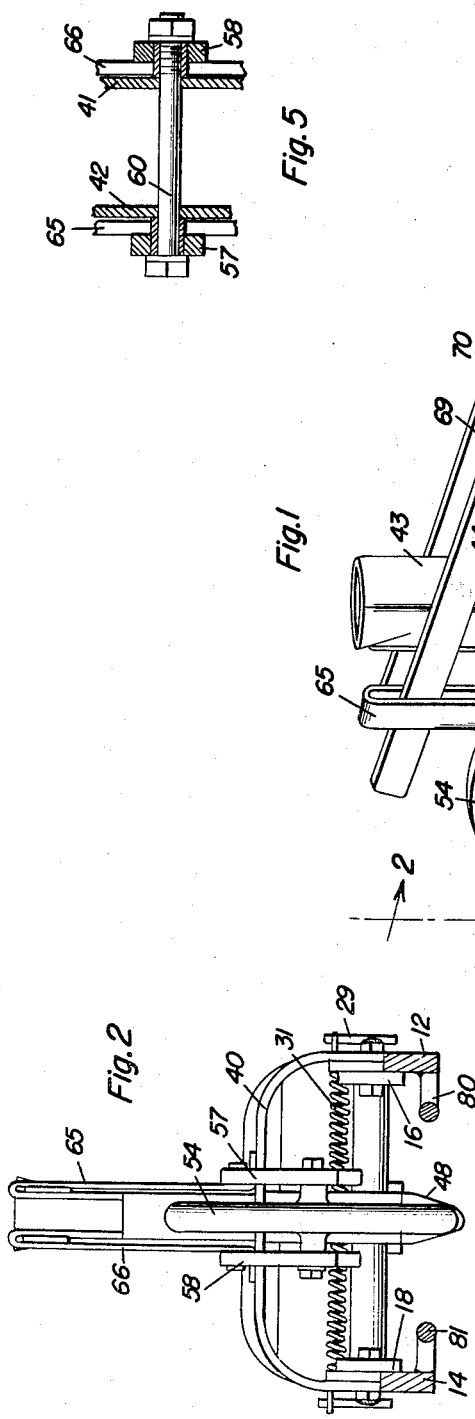
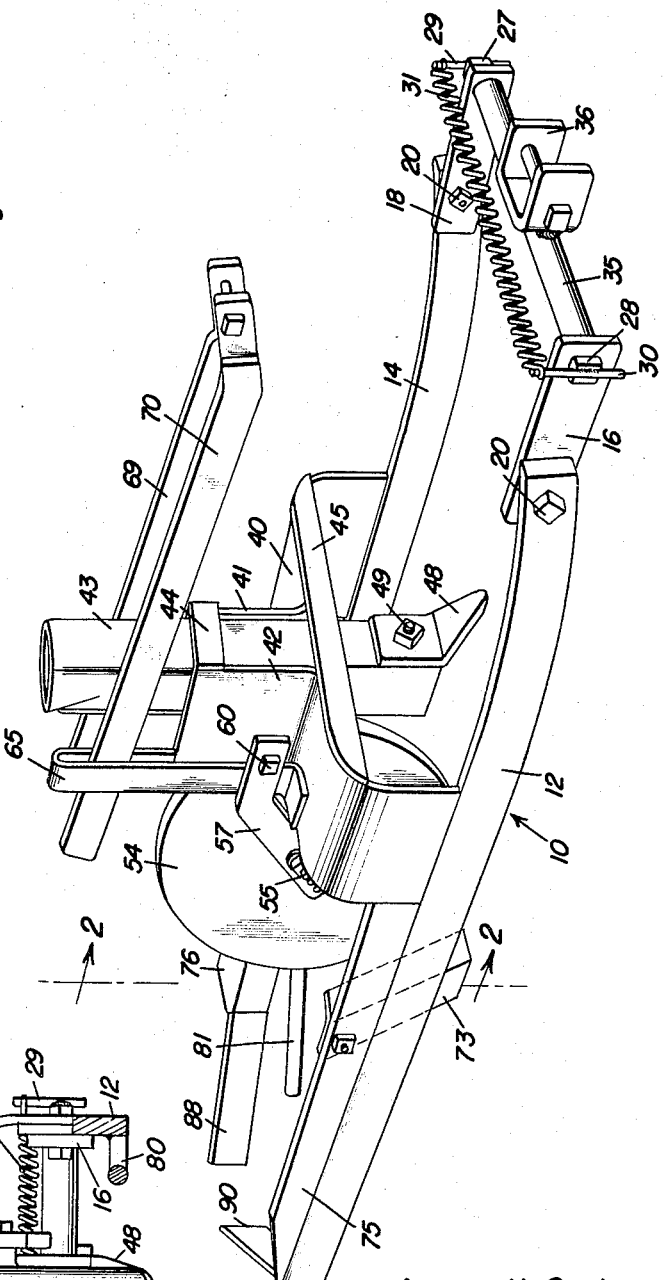
Amous H. Sooter
INVENTOR.
BY *Clarence A. O'Brien*
*and Harvey B. Jacobson*
Attorneys

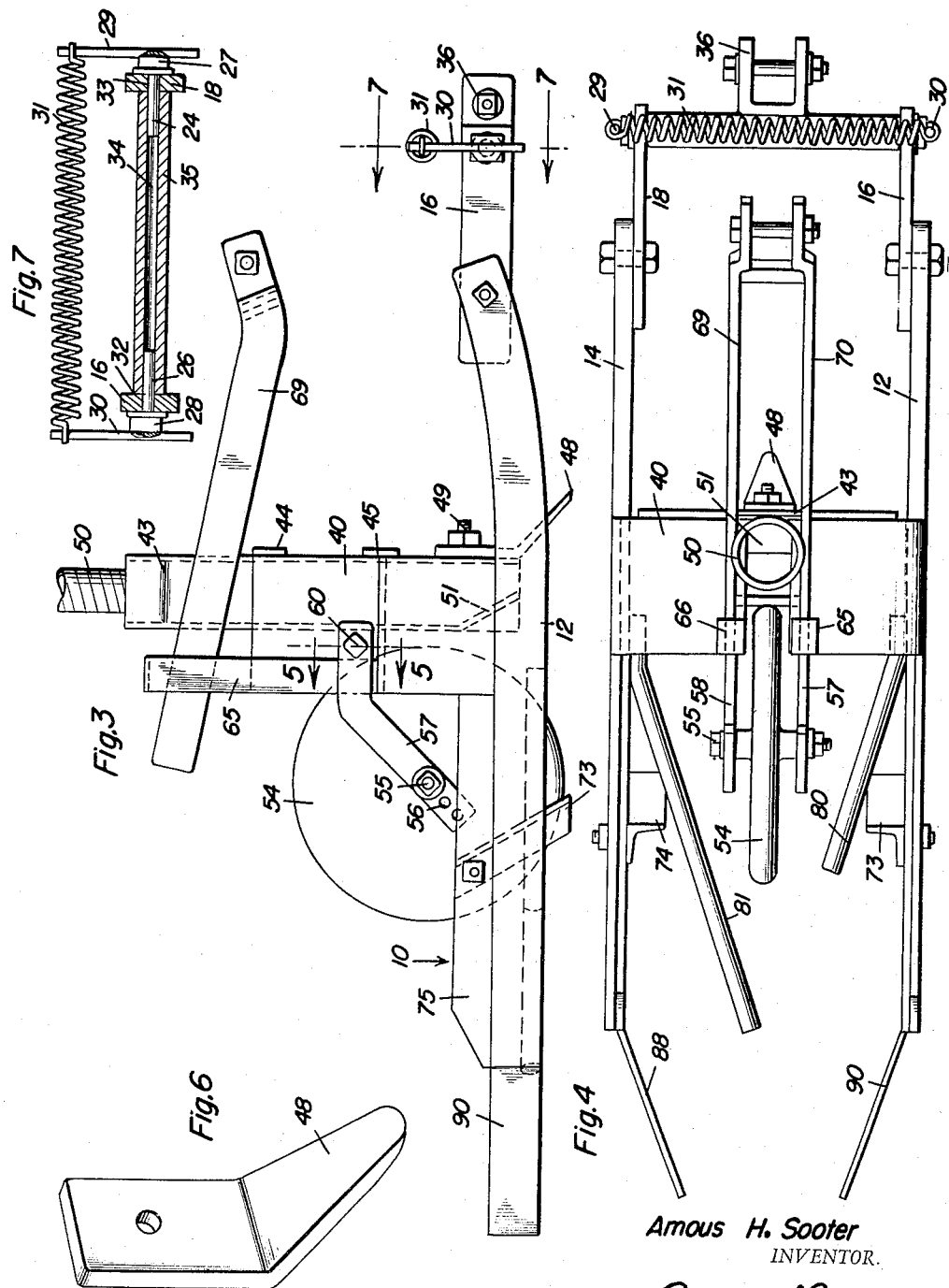

United States Patent Office 2,961,981
Patented Nov. 29, 1960

2,961,981

PLANTER

Amous H. Sooter, P.O. Box 242, Lorenzo, Tex., assignor of one-third to G. H. Nelson, Lubbock, Tex.

Filed Oct. 8, 1957, Ser. No. 688,926

3 Claims. (Cl. 111—85)

This invention relates to agricultural implements and more particularly to a planter.

An object of the invention is to provide an even floating planter which follows the contours and irregularities of the soil very smoothly, doing a generally better job of planting.

A further object of the invention is to provide a planter which floats about an approximately horizontal pivot at the rear of a tractor or other implement, the planter being structurally novel and improved, and to my knowledge, arranged to form a unique planter.

My planter has a pair of rails whose front ends are connected by a pivotal connection to the tractor or other means for drawing the planter. The rails form a floating bottom which support an opening plow on approximately a center line therebetween and which is adapted to receive seed from a seed chute. The press wheel is mounted behind the opening plow as is expected, but I have side plows, covering rods and adjustable smoothing members behind the press wheel, all of which are mounted in such a way as to oscillate up and down to follow the irregularities of the terrain within limits as constrained by means to serve this limiting purpose.

Another object of the invention is to provide a practical planter, which, through rather extensive trial, has shown better results than any planter of which I am aware due to the physical construction of my planter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a planter constructed in accordance with the invention.

Figure 2 is a transverse sectional view taken on the line 2—2 of Figure 1.

Figure 3 is a side view of the planter in Figure 1.

Figure 4 is a top view of the planter in Figure 1.

Figure 5 is a sectional view on enlarged scale taken on the line 5—5 of Figure 3.

Figure 6 is a perspective view of the opening plow.

Figure 7 is a sectional view on enlarged scale and taken on the line 7—7 of Figure 3 showing the means for pivotally connecting the planter to a drawbar, tongue or other drawing member.

In the accompanying drawings there is what I term an even floating planter 10. This name is selected because the planter floats gently behind the tractor, moving up and down in accordance with the condition of the soil over which it is being drawn. It deposits seeds in an even and smooth manner.

My planter 10 is constructed of a pair of rails or sides 12 and 14 that have front extensions 16 and 18 bolted as at 20 thereto. The front extensions and rails could be made in one piece, but this would sacrifice a possible adjustment in that the front extensions can be tilted with respect to the rails and bolted in place. There are means for pivotally attaching the front extensions to a tractor drawbar or the like. These means consist of a pair of pins 24 and 26 which have heads 27 and 28 to which rods 29 and 30 are welded. Spring 31 is attached at its ends to the rods 29 and 30 and the bias of the spring is in a direction which tends to push the pins 24 and 26 through holes 32 and 33 in the frontal extensions 16 and 18 and into the bore 34 of sleeve 35. The sleeve has a coupling 36 welded to it intermediate its ends and the coupling connects with a tractor drawbar or the like. The pins 26 and 24 plus the other structure described in connection with it constitute a quick disconnect means for attaching the planter 10 to the draft implement whatever that implement might be and including tractors.

Support 40 is arranged in the form of a bridge that arches across the rails 12 and 14 and that is secured to them between their front and rear ends. The support has upstanding plates 41 and 42 between which the square sleeve 43 is passed and fastened. Transverse braces 44 and 45 are secured to the plates 41 and 42 and to the lower parts of the support 40 for rigidifying the planter.

A furrow opening plow 48 is made of a one-piece angulated plate whose upper part is bolted as at 49 to the front of the sleeve 43 and whose lower part is somewhat sharpened and angled forwardly. This is adapted to open a furrow while the seed is adapted to be passed through sleeve 43 which is registered with seed tube 50 of ordinary construction. Baffle 51 at the lower end of the sleeve 43 directs the seed forward into the furrow that is opened by plow 48.

Press wheel 54 is mounted on a spindle 55, the latter being in a pair of selected apertures 56 in the arms 57 and 58. These arms are angular with their upper ends approximately horizontal and connected by bolt 60 to the side plates 42 and 41. Two vertical and generally U-shaped guides 65 and 66 are attached to the support 40 at the lower feet thereof and are attached to the side plates 41 and 42. The generally U-shaped guides have lift arms 69 and 70 passed through them in order to limit the up and down movement of the planter 10 thereby constraining the pivotal movement of the planter. These guides are also used with the lift arms 69 and 70 to constitute means by which to elevate the planter when moving it from one field to another or for any other purpose.

Lateral plows 73 and 74 are in the form of short angle iron members that are bolted to the side boards 75 and 76 on the upper edges of rails 12 and 14. Plows 73 and 74 direct the soil inwardly toward the press wheel. They are located intermediate the ends of the covering rods 80 and 81. The rods are secured to the rails of the floating bottom of my planter and one is shorter than the other. One covering rod extends completely behind press wheel 54 and the other terminates at about the rear edge of the press wheel. Bendable covering scrapers 88 and 90 are attached at the aft ends of rails 14 and 12 respectively, in order to perform the final covering operation. These are formed as longitudinal extensions of the rails 12 and 14 but they are capable of being bent inward to a selected angularity in order that the final covering contour may be selected by the farmer.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A floating planter comprising a pair of side rails, a transverse support attached to said rails and holding said rails spaced from each other, a quick disconnect means adapted to connect the rails to a device to draw the planter over the soil, said quick disconnect means including a pair of rail extensions having apertures and secured to the forward ends of said rails, a pivot about which said rails and extensions are capable of oscillating to follow the irregularities of the soil, said pivot including a sleeve disposed between said extensions, a pair of pins separably mounted in said apertures and the bore of said sleeve, thereby connecting said sleeve to said extensions, means including a spring yieldingly holding said pins in said apertures and said bore, means carried by said support for opening a furrow and mounting a seed drop behind said furrow opening means for dropping seeds in the furrow, a press wheel carried by said support behind said furrow opening means and seed drop, covering means for the furrow carried by said rails and extending alongside of and behind said press wheel, said covering means including a pair of covering rods attached to said rails, one of said covering rods terminating behind said press wheel and the other of said covering rods terminating on one side of the press wheel and covering scrapers attached to said rails and located behind said covering rods, and said covering scrapers being adjustable inward of the longitudinal axis of the planter.

2. The floating planter of claim 1 wherein there are side plows connected to said side rails and located in advance of said covering rods.

3. The floating planter of claim 1 wherein there are upwardly extending guides secured to said support, lift arms in engagement with said upwardly extending guides to constrain the movements of said planter and to provide additional means by which to connect the planter with a device to draw the planter over the soil and to elevate the planter.

References Cited in the file of this patent

UNITED STATES PATENTS

| | | |
|---|---|---|
| 1,030,244 | Payne | June 18, 1912 |
| 1,254,859 | Siemann | Jan. 29, 1918 |
| 1,318,365 | Erway | Oct. 14, 1919 |
| 1,635,866 | Townsend et al. | July 12, 1927 |
| 1,882,603 | Honer | Oct. 11, 1932 |
| 2,400,522 | Lantz | May 21, 1946 |
| 2,483,204 | Johnson et al. | Sept. 27, 1949 |
| 2,524,083 | Ronning | Oct. 3, 1950 |
| 2,545,747 | Oswald et al. | Mar. 20, 1951 |
| 2,601,834 | Carter | July 1, 1952 |
| 2,650,103 | Oehler | Aug. 25, 1953 |
| 2,815,964 | Brown | Dec. 10, 1957 |

FOREIGN PATENTS

| | | |
|---|---|---|
| 229,111 | Great Britain | Feb. 19, 1925 |